United States Patent
Pateromichelakis et al.

(10) Patent No.: US 11,140,573 B2
(45) Date of Patent: Oct. 5, 2021

(54) APPARATUS FOR V2X-ORIENTED LOCAL E2E PATH ESTABLISHMENT AND QOS CONTROL

(71) Applicant: Huawei Technologies Co., Ltd., Shenzhen (CN)

(72) Inventors: Emmanouil Pateromichelakis, Munich (DE); Apostolos Kousaridas, Munich (DE); Chan Zhou, Munich (DE); Xueli An, Munich (DE); Chenghui Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 16/788,244

(22) Filed: Feb. 11, 2020

(65) Prior Publication Data

US 2020/0187042 A1 Jun. 11, 2020

Related U.S. Application Data

(63) Continuation of application No. PCT/EP2017/070465, filed on Aug. 11, 2017.

(51) Int. Cl.
*H04W 28/02* (2009.01)
*H04W 76/11* (2018.01)
*H04W 28/24* (2009.01)

(52) U.S. Cl.
CPC ....... *H04W 28/0268* (2013.01); *H04W 28/24* (2013.01); *H04W 76/11* (2018.02)

(58) Field of Classification Search
CPC . H04W 28/0268; H04W 76/11; H04W 28/24; H04W 28/02; H04W 28/0205;

(Continued)

(56) References Cited

U.S. PATENT DOCUMENTS

2015/0110048 A1 4/2015 Damnjanovic et al.
2015/0244429 A1* 8/2015 Zhang ............... H04B 7/024
370/329

FOREIGN PATENT DOCUMENTS

CN 102904859 A 1/2013
CN 103024823 A 4/2013
(Continued)

OTHER PUBLICATIONS

Rost, Peter, et al. "Network slicing to enable scalability and flexibility in 5G mobile networks." IEEE Communications magazine 55.5 (2017): 72-79. (Year: 2017).*

(Continued)

*Primary Examiner* — Sharad Rampuria
(74) *Attorney, Agent, or Firm* — Leydig, Voit & Mayer, Ltd.

(57) ABSTRACT

A configuration module allows for the establishment of a local end-to-end (E2E) path connecting at least one source node and at least one target node via at least one radio access network (RAN) node. The configuration module is configured to select data radio bearers (DRBs) per quality of service (QoS) flow based on inter-node information from the at least one source node, the at least one target node, the at least one RAN node and all other nodes involved in establishing the local E2E path, and is also configured to initiate, after selecting the DRBs per QoS flow, a radio resource communication connection configuration using an identification of the local E2E path to be established. Thereby, a localized traffic between the at least one source node and the at least one target node can be exchanged with QoS guarantees.

14 Claims, 5 Drawing Sheets

(58) Field of Classification Search
CPC ........... H04W 28/021; H04W 28/0247; H04W 28/0252; H04W 28/0257; H04W 28/0263; H04W 28/0273; H04L 47/10
See application file for complete search history.

(56) References Cited

FOREIGN PATENT DOCUMENTS

| | | |
|---|---|---|
| CN | 103428731 A | 12/2013 |
| CN | 104125608 A | 10/2014 |
| CN | 104754750 A | 7/2015 |
| CN | 105637965 A | 6/2016 |
| CN | 106341839 A | 1/2017 |
| WO | 2013163814 A1 | 11/2013 |

OTHER PUBLICATIONS

"QoS framework: Data Flow and DRB mapping," 3GPP TSG-RAN2#95, Gothenburg, Sweden, R2-165404, XP051126920, pp. 1-3, 3rd Generation Partnership Project, Valbonne, France (Aug. 22-26, 2016).

"3rd Generation Partnership Project; Technical Specification Group Services and System Aspects; Service requirements for V2X services; Stage 1 (Release 14)," 3GPP TS 22.185 V14.3.0, pp. 1-14, 3rd Generation Partnership Project, Valbonne, France (Mar. 2017).

"3rd Generation Partnership Project; Technical Specification Group Radio Access Network; Study on New Radio Access Technology; Radio Interface Protocol Aspects (Release 14)," 3GPP TR 38.804 V14.0.0, pp. 1-57, 3rd Generation Partnership Project, Valbonne, France (Mar. 2017).

"3rd Generation Partnership Project; Technical Specification Group Services and System Aspects; System Architecture for the 5G System; Stage 2 (Release 15)," 3GPP TS 23.501 V1.0.0, pp. 1-146, 3rd Generation Partnership Project, Valbonne, France (Jun. 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-721, 3rd Generation Partnership Project, Valbonne, France (Apr. 2017).

"3rd Generation Partnership Project; Technical Specification Group Services and System Aspects; Enhancement of 3GPP Support for V2X Scenarios; Stage 1 (Release 15)," 3GPP TS 22.cde V1.0.0, pp. 1-17, 3rd Generation Partnership Project, Valbonne, France (Mar. 2017).

* cited by examiner

APPARATUS FOR V2X-ORIENTED LOCAL E2E PATH ESTABLISHMENT AND QOS CONTROL

CROSS-REFERENCE TO RELATED APPLICATIONS

This application is a continuation of International Patent Application No. PCT/EP2017/070465, filed on Aug. 11, 2017, The disclosure of the aforementioned patent application is hereby incorporated by reference in its entirety.

FIELD

The present invention relates to the field of wireless communications, and more particularly to an apparatus and method for establishing a local end-to-end (E2E) path in a vehicle-to-everything (V2X) service communication.

BACKGROUND

According to the industry consensus, the 5th generation (5G) mobile technology will be standardized and deployed by 2020. Compared to the 4th generation (4G) mobile technology, the devices and applications of the next generation network will support use cases with a very high diversity in terms of performance attributes, such as ultra-reliable communications for mission critical services, eHealth, public safety, tactile Internet, connectivity for drones and real-time vehicle control. In vehicular communications, the term V2X, standing for vehicle-to-everything or vehicle-to-X, may include vehicle-to-vehicle (V2V), vehicle-to-pedestrian (V2P), vehicle-to-infrastructure (V2I) and vehicle-to-network (V2N). By nature, the V2X services are fully localized. In the case of cellular-assisted V2X, the localized processing and traffic treatment involves radio access nodes (e.g., base stations (BSs)), which serve both as anchor points and controllers for the V2X service communication.

In the technical specification (TS) entitled: 3GPP TS 22.185, "Service requirements for V2X services", V14.3.0 (2017-03), some 5th generation (5G) V2X use cases being related to vehicle safety and vehicle automation have been identified amongst vehicle platooning, cooperative maneuver and emergency brake. However, all these use cases require very low delay and high reliability, and in the current architecture involving multiple layers and additional delays for interactions amongst different domains (e.g., radio access network (RAN), core network (CN)), it may become difficult for a cellular network to provide a latency-limited E2E performance guarantee within a V2X communication.

According to the technical report (TR) entitled: 3GPP TR 38.804, "Study on new radio access technology Radio interface protocol aspects", V14.0.0 (2017-03), the quality of service (QoS) in 5G RAN (also designated as new radio (NR)) can be controlled using a 2-step mapping: a mapping of internet protocol (IP) flows to QoS flows, which is a mapping step served by the non-access stratum (NAS) sublayer of the layer 2, and a mapping of QoS flows to data radio bearers (DRBs), which is a mapping step served by the access stratum (AS) sublayer of the layer 2. In NR, a DRB defines the packet treatment on the radio interface (Uu). The DRB serves packets with the same packet forwarding treatment, and separate DRBs may be established for QoS flows requiring different packet forwarding treatments.

In order to establish a path consisting of access links connecting any two vehicles, a V2X APP-to-QoS flow mapping and a QoS flow-to-DRB mapping at both access links are needed. The V2X APP-to-QoS flow mapping may be decided in a large time scale based, for example, on mapping tables. However, the teachings of the 5G prior art regarding the QoS flow-to-DRB mapping are silent about the exchange and coordinated utilization of all the information related to backhaul (BH) and access links between the involved nodes. Yet, all this information is useful to meet the V2X service key performance indicator (KPI) (e.g., ultra-low E2E latency, high reliability) and to provide similar and coordinated QoS treatment at different access links. In addition, any information about the backhaul conditions and availability may play an important role in selection of proper QoS. It may be the case when there are one or more links providing bottleneck which will degrade the achieved performance, or when there are additional delays caused by coping with QoS fluctuations in different parts of the E2E path.

SUMMARY

The present disclosure provides for establishing a local E2E path connecting at least two nodes via at least one radio access network (RAN) node in order to allow an exchange of localized traffic with V2X QoS guarantees.

According to a first aspect, the disclosure relates to a configuration module for establishing a local end-to-end (E2E) path connecting at least one source node and at least one target node via at least one radio access network (RAN) node. The configuration module is configured to select data radio bearers (DRBs) per quality of service (QoS) flow based on inter-node information from the at least one source node, the at least one target node, the at least one radio access network (RAN) node, and all other nodes involved in establishing the local end-to-end (E2E) path. The configuration module is configured to initiate, after selecting the data radio bearers per quality of service flow, a radio resource communication (RRC) connection configuration using an identification (ID) of the local end-to-end path to be established.

According to an implementation form of the first aspect, the inter-node information may include, in a non-restrictive manner, backhaul (BH) information.

According to a second aspect, the disclosure relates to a system including at least one radio access network node as specified in the first aspect and at least one core network (CN) node (CN-C entity). The at least one radio access network node includes a configuration module as described in the first aspect.

According to an implementation form of the second aspect, the at least one radio access network node is configured to select the data radio bearers per quality of service flow through a selection by negotiating the selection of the data radio bearers per quality of service flow with all the other radio access network nodes involved in establishing the local end-to-end path.

According to a further implementation form of the second aspect, negotiating the selection of the data radio bearers per quality of service flow is based on obtaining a homogeneous quality of service over the local end-to-end path.

According to a further implementation form of the second aspect, negotiating the selection of the data radio bearers per quality of service flow includes accepting the selection, or rejecting the selection and modifying the selection, or rejecting the selection and suggesting another selection.

According to a further implementation form of the second aspect, the at least one radio access network node is configured to initiate and trigger, upon selecting the data radio bearers per quality of service flow, the radio resource communication connection configuration using the identification of the local end-to-end path to be established, and configured to transmit the identification of the local end-to-end path to be established towards the at least one source node and the at least one target node.

According to a further implementation form of the second aspect, the data radio bearers per quality of service flow to be selected are beforehand filtered by the at least one radio access network node and/or the at least one source node and/or the at least one target node.

According to a further implementation form of the second aspect, the at least one radio access network node is configured to notify the at least one core network node about the local end-to-end path to be established and the selected data radio bearers per quality of service flow.

According to a further implementation form of the second aspect, a radio resource control-to-medium access control (MAC) signaling is performed at the at least one radio access network node in order to update a scheduler in a medium access control (MAC) layer concerning a configuration of the selected data radio bearers per quality of service flow.

According to a third aspect, the disclosure relates to a system including at least one radio access network node as specified in the first aspect and at least one core network node. The at least one core network node includes a configuration module as described in the first aspect.

According to an implementation form of the third aspect, the at least one core network node is configured to select the data radio bearers per quality of service flow for both the at least one source node and the at least one target node.

According to a further implementation form of the third aspect, the at least one core network node is configured to notify the at least one radio access network node involved in establishing the local end-to-end path about the selected data radio bearers per quality of service flow.

According to a further implementation form of the third aspect, the notified at least one radio access network node is configured to trigger the radio resource communication connection configuration using the identification of the local end-to-end path to be established, and configured to transmit the identification of the local end-to-end path to be established towards the at least one source node and the at least one target node.

According to a fourth aspect, the disclosure relates to a method for establishing a local end-to-end path connecting at least one source node and at least one target node via at least one radio access network node. The method includes the step of selecting data radio bearers per quality of service flow based on inter-node information from the at least one source node, the at least one target node, the at least one radio access network node and all other nodes involved in establishing the local end-to-end path, and the step of initiating, after selecting the data radio bearers per quality of service flow, a radio resource communication connection configuration using an identification of the local end-to-end path to be established.

According to an implementation form of the fourth aspect, when performed by the at least one radio access network node, the step of selecting the data radio bearers per quality of service flow through a selection includes negotiating the selection of the data radio bearers per quality of service flow with all the other radio access network nodes involved in establishing the local end-to-end path.

According to a further implementation form of the fourth aspect when performed by the at least one radio access network node, the sub-step of negotiating the selection of the data radio bearers per quality of service flow includes accepting the selection, or rejecting the selection and modifying the selection, or rejecting the selection and suggesting another selection.

According to a further implementation form of the fourth aspect, when performed by the at least one radio access network node, the method includes the step of triggering, by the at least one radio access network node upon initiating the data radio bearers per quality of service flow, the radio resource communication connection configuration using the identification of the local end-to-end path to be established.

According to a further implementation form of the fourth aspect, when performed by the at least one radio access network node, the method includes the step of filtering, by the at least one radio access network node and prior to selecting the data radio bearers per quality of service flow, the data radio bearers per quality of service flow.

According to a further implementation form of the fourth aspect, when performed by the at least one radio access network node, the method includes the step of notifying, by the at least one radio access network node and after selecting the data radio bearers per quality of service flow, at least one core network node about the local end-to-end path to be established and the selected data radio bearers per quality of service flow.

According to a further implementation form of the fourth aspect, when performed by the at least one radio access network node, the method includes the step of performing, after selecting the data radio bearers per quality of service flow, a radio resource control-to-medium access control signaling at the at least one radio access network node in order to update a scheduler in a medium access control layer concerning a configuration of the selected data radio bearers (DRBs) per quality of service flow.

According to a further implementation form of the fourth aspect when performed by at least one core network node, the step of selecting the data radio bearers per quality of service flow includes selecting the data radio bearers per quality of service flow for both the at least one source node and the at least one target node.

According to a further implementation form of the fourth aspect, when performed by the at least one core network node, the method includes the step of notifying, by the at least one core network node and after selecting the data radio bearers per quality of service flow, at least one radio access network node involved in establishing the local end-to-end path about the selected data radio bearers per quality of service flow.

According to a further implementation form of the fourth aspect, when performed by at least one core network node, the notified at least one radio access network node is configured to trigger the radio resource communication connection configuration using the identification of the local end-to-end path to be established.

According to a further implementation form of the fourth aspect when performed by at least one core network node, the method includes the step of triggering, upon receiving a local end-to-end path request from the at least one source node through the at least one radio access network node serving the at least one source node, an establishment of the local end-to-end path, by transmitting a session management request towards the at least one radio access network node serving the at least one target node.

According to a further implementation form of the fourth aspect, when performed by at least one core network node, an establishment of the local end-to-end path is triggered by transmitting a service request from the at least one source node or all other nodes of the network towards the at least one core network node through the at least one radio access network node serving the at least one source node.

According to a fifth aspect, the disclosure relates to a computer program including a program code for performing the method according to the fourth aspect or any one of the implementation forms of the fourth aspect when executed on a computer.

Thereby, the method can be performed in an automatic and repeatable manner. Furthermore, the computer program may be performed by the above apparatuses.

More specifically, it should be noted that all the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the Internet.

These and other aspects of the disclosure will be apparent and elucidated with reference to the embodiments described hereinafter.

BRIEF DESCRIPTION OF THE DRAWINGS

In the following detailed portion of the present disclosure, the disclosure will be explained in more details with reference to the exemplary embodiments shown in the drawings, in which.

Identical reference signs are used for identical or at least functionally equivalent features.

DETAILED DESCRIPTION

In the following, it shall be understood that the term V2X, standing for vehicle-to-everything or vehicle-to-X, may include, in a non-restrictive manner, vehicle-to-vehicle (V2V), vehicle-to-pedestrian (V2P), vehicle-to-infrastructure (V2I) and vehicle-to-network (V2N) amongst others.

Figure 1:
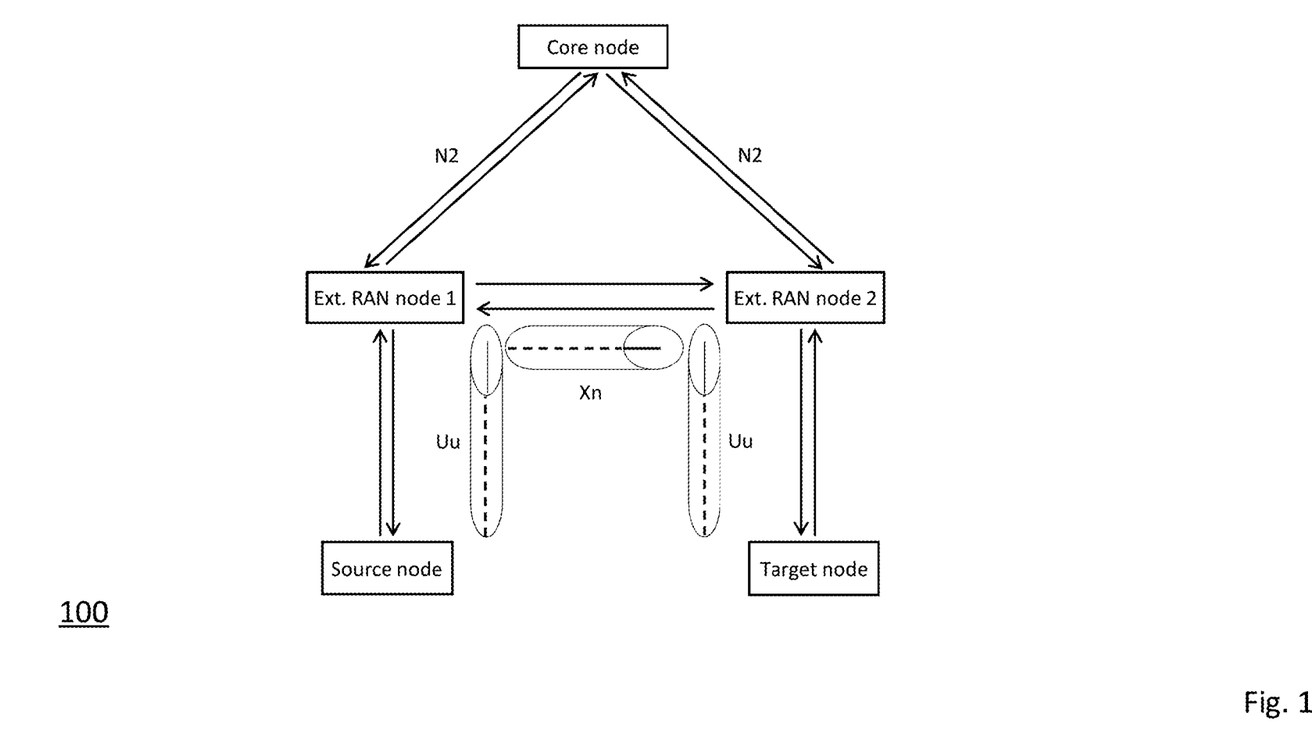
FIG. 1 shows a schematic communication system with signaling messages across interfaces for establishing a local E2E path connecting a source node and a target node by means of RAN nodes extended with the functionality of a configuration module, according to an embodiment of the present disclosure.

FIG. 1 shows a schematic communication system 100 with signaling messages across interfaces (Uu, N2/NG2, Xn) for establishing a local E2E path connecting a source node (e.g., a source or transmitting UE) and a target node (e.g., a target or receiving UE) by means of serving RAN nodes (e.g., base stations (BSs), also known as gNBs in 5G terminology) extended with the functionality of a respective configuration module, according to an embodiment of the present disclosure.

The RAN nodes, as functionally extended with the functionality of the configuration module, are depicted as Ext. RAN node 1 and Ext. RAN node 2, and will be hereinafter referred to extended RAN nodes 1 and 2, respectively. The configuration module is respectively implemented in the RAN nodes and provides each RAN node hosting the configuration module with the functionality (e.g., a geo-link establishment functionality) of establishing a local E2E path connecting the source node and the target node.

Figure 2:
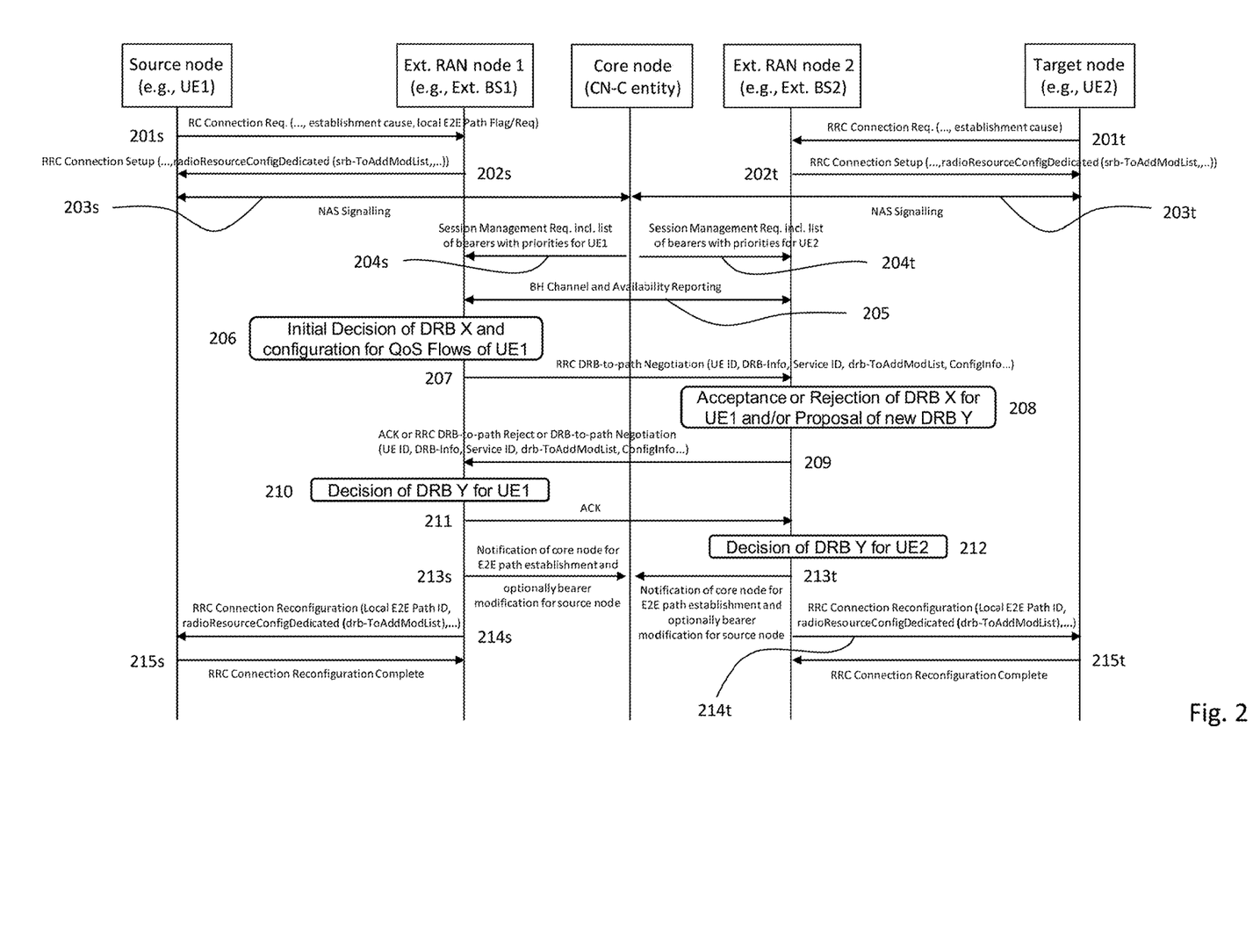
FIG. 2 shows a message sequence chart illustrating the establishment of a local E2E path connecting a source node and a target node by means of RAN nodes extended with the functionality of a respective configuration module, according to an embodiment of the present disclosure.

Referring to FIG. 1, FIG. 2 shows a message sequence chart (MSC) illustrating the establishment of the local E2E path connecting the source node (e.g., UE1) and the target node (e.g., UE2) by means of the extended RAN node 1 (e.g., Ext. BS1) serving the source node, the extended RAN node 2 (e.g., Ext. BS2) serving the target node and a core network (CN) node as a CN-C entity (e.g., a mobility management entity (MME), an access and mobility function (AMF) entity), according to an embodiment of the present disclosure.

Each extended RAN node (i.e., Ext. RAN node 1 and Ext. RAN node 2) requires, from the user side (i.e., from the respective source and target nodes), radio measurements (steps 201s and 201t). In order to initiate and trigger a RRC connection configuration, in step 201s, the source node transmits a RRC connection request message across a Uu interface towards the extended RAN node 1 serving the source node. The RRC connection request message may, for example, include a parameter indicating an establishment cause and be extended with an additional "local E2E path flag/req" parameter indicating that a local E2E path is requested to support a request for the local E2E path establishment. Thereby, the source node notifies the network (NW) about or requests from the network the local E2E path establishment for a given V2X application. In step 201t, the target node, for its part, transmits its RRC connection request message across the Uu interface towards the extended RAN node 2 serving the target node. This RRC connection request message may, for example, include a parameter indicating an establishment cause.

In step 202s, in response to the RRC connection request message received from the source node, the extended RAN node 1 transmits a RRC connection setup message across the Uu interface towards the source node. In step 202t, in response to the RRC connection request message received from the target node, the extended RAN node 2, for its part, transmits its RRC connection setup message across the Uu interface towards the target node. Each RRC connection setup message may, for example, include a so-called "radioResourceConfigDedicated" parameter including the "srb-ToAddModList" information element (IE) as disclosed in the technical specification: 3GPP TS 36.331, V14.2.2 (2017-04).

Once the respective RRC connection has been set up, each one of the source and target nodes uses that radio connection in respective steps 203s and 203t in order to communicate with the CN node using a respective non-access stratum (NAS) signaling and to thereby coordinate the service.

In steps 204s and 204t, the CN node (CN-C entity) transmits, across a N2/NG2 interface and towards the source and target nodes, a respective session management request message including information about the list of DRBs and about the priorities of the requested V2X service for the source node (step 204s) and the target node (step 204t), respectively.

In step 205, on demand reporting about the backhaul (BH) availability and performance in terms of capacity and latency is exchanged across an Xn interface between the extended RAN node 1 and the extended RAN node 2 involved in establishing the potential local E2E path.

In step 206, in the uplink, the extended RAN node 1 serving the source node initially decides on or selects the QoS flow-to-DRB mapping (i.e., select the DRBs (e.g., DRB X) per QoS flow) for the source node based on the preferences and/or recommendations of the source node using, for example, information about UE context, application trigger, radio measurements and/or UE assistance, the latter being provided by a so-called "UEAssistanceInformation" message as found in section 5.6.10 of the technical specification: 3GPP TS 36.331, V14.2.2 (2017-04).

In step 207, the extended RAN node 1 communicates about its initial decision on the selection and configuration of the DRB(s) (e.g., DRB X) per QoS flow by transmitting an inter-node RRC message (i.e., a so-called "RRC-DRB-to-path Negotiation" message) towards the extended RAN node 2 in order to jointly negotiate said selection of the DRB(s) per quality of service (QoS) flow, the negotiation being based on obtaining a homogeneous quality of service (QoS) over the local end-to-end (E2E) path. The inter-node RRC message (i.e., the "RRC-DRB-to-path Negotiation" message) may include, in a non-restrictive manner, the following parameters: an identifier (ID) of the source node (e.g., UE ID), a service ID, an ID of the local E2E path to be established, information on the DRB(s) that is(are) requested by the source node and is(are) to be considered at the extended RAN node 2 for the target node using the same service as the path to be established, an abstract or detailed configuration of the DRB(s) or a list of the DRBs to be considered or negotiated, information on lower layer configurations for access stratum (AS) control (e.g., hybrid automatic repeat request (HARQ) scheme, random access channel (RACH) isolation between all the local E2E paths, PHY layer numerologies, and so on), and abstract (e.g., comparison of ideal BH versus non-ideal BH) or detailed BH Information (BH channel state information (CSI)/radio resource management (RRM) information, remaining BH capacity, maximum BH latency) as required for the local E2E path.

In step 208, in the downlink, the extended RAN node 2 serving the target node decides, based on the received information from the extended RAN node 1 and additional information about traffic, resource, load and backhaul (BH) situation, to accept the selection of the DRB(s) for the target node if a homogeneous quality of service (QoS) over the local end-to-end (E2E) path can be obtained, or otherwise reject it and either modify the selection of the DRB(s) or suggest other DRB(s) (e.g., DRB Y) in order to obtain a homogeneous quality of service (QoS) over the local end-to-end (E2E) path. In the case of a non-suitability of the DRB(s) for the local E2E path at the extended RAN node 2, the negotiation between the extended RAN nodes 1 and 2 may be undertaken in order to identify and select one or more common DRBs. The corresponding DRB selection may in particular take account of the BH availability and performance in terms of capacity and latency. Indeed, the BH link may provide limitations as regards the E2E performance since it may lead to a bottleneck and thereby to a degradation of the performance of the access links. Therefore, the selection of the DRBs for the access links needs to take into account the backhaul limitations in order to ensure a homogeneous QoS over the path. It is, for example, the case when there is a high latency non-ideal wireless backhaul, which will require different DRB configurations at the access links in order to be able to meet the E2E latency requirements of the service. In particular, at the establishment and negotiation phases, the extended RAN nodes 1 and 2 and/or the source and target nodes need to filter the DRBs based on the BH constraints in order to eliminate the DRBs that cannot support the local E2E path.

In step 209, the extended RAN node 2 serving the target node transmits its decision about to accept the selection of the DRB(s) for the target node, or reject it and either modify the selection of the DRB(s) or suggest other DRB(s) (e.g., DRB Y), towards the extended RAN node 1 serving the source node using an inter-node RRC message (i.e., a so-called "ACK" (acknowledgement) message to accept the selection, a so-called "RRC-DRB-to-path Reject" message to reject the selection or a so-called "RRC-DRB-to-path Negotiation" message to negotiate the selection of the modified and/or suggested DRB(s)).

In step 210, upon receiving the decision of the extended RAN node 2, the extended RAN node 1 decide in turn to accept that decision, or reject it and either modify the DRB(s) selected by the extended RAN node 2 or suggest other DRB(s) (e.g., DRB Z). As depicted in FIG. 2, if the extended RAN node 1 accepts, for the source node, the decision of the extended RAN node 2 of suggesting a new DRB Y, then it transmits, in step 211, a so-called ACK (acknowledgement) message towards the extended RAN node 2, which confirms, in step 212, its acceptance of the new DRB Y for the target node.

In steps 213s and 213t, after the agreement on the selection of the DRB(s), the extended RAN nodes 1 and 2 jointly notify the CN node (CN-C entity) about the local E2E path to be established and the selected DRBs per QoS flow by transmitting a respective notification message across the N2/NG2 interface towards the CN node.

In steps 214s and 214t, after the agreement on the selection of the DRB(s), the extended RAN nodes 1 and 2 jointly initiate and trigger a RRC connection reconfiguration by transmitting a respective so-called "RRC connection reconfiguration" message across a Uu interface towards the source node (step 214s) and the target node (step 214t). Each RRC connection reconfiguration message may, for example, include the local E2E path ID parameter indicating the ID of the local E2E path to be established.

In steps 215s and 215t, in response to their received RRC connection reconfiguration message, the source node and the target node jointly transmit a respective RRC connection completion message across the Uu interface towards the extended RAN node 1 serving the source node and the extended RAN node 2 serving the target node, thereby completing the establishment of the local E2E path.

Figure 3:
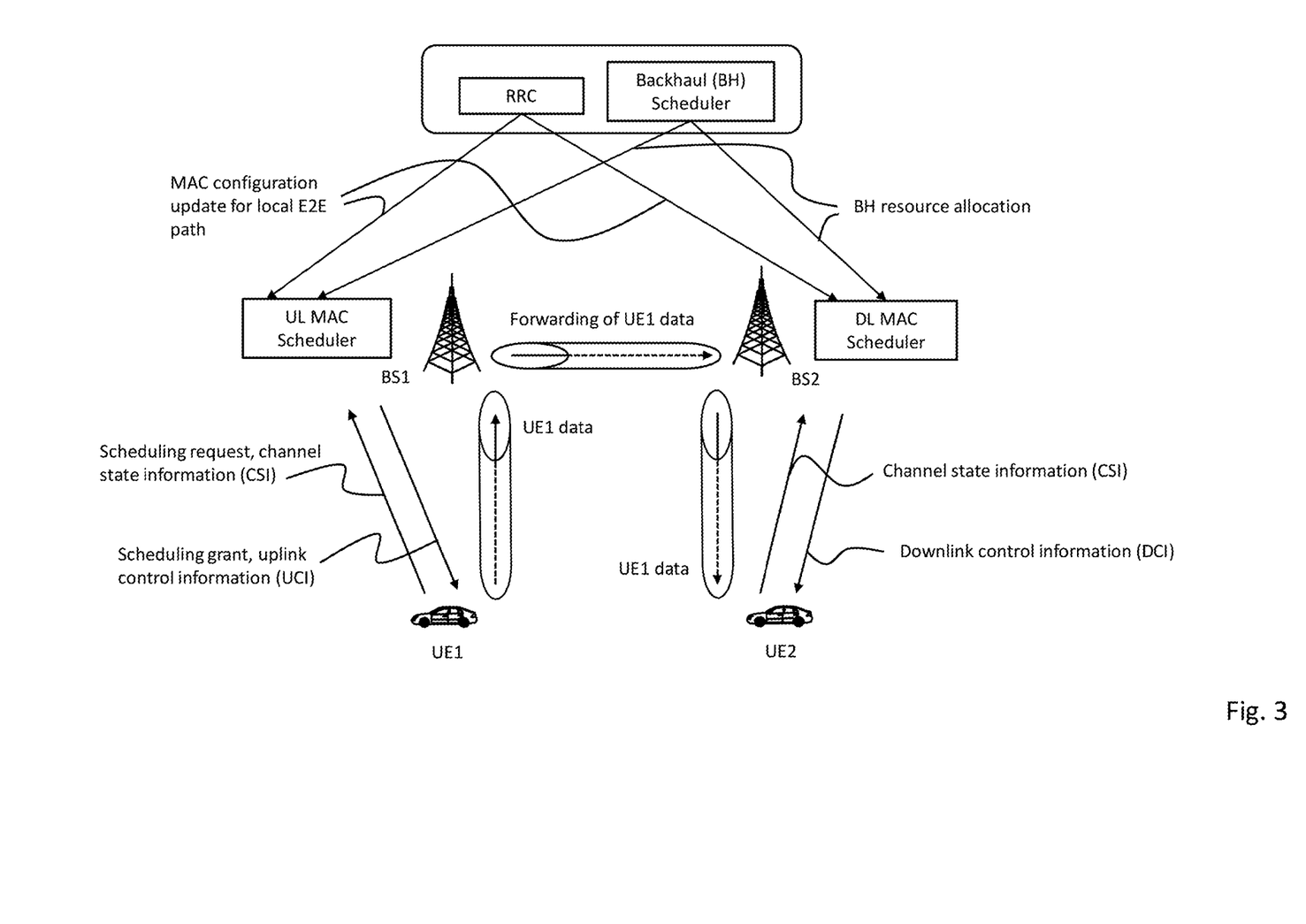
FIG. 3 shows a RRC-to-MAC signaling and a signaling between UL/DL/BH schedulers, according to an embodiment of the present disclosure.

Referring to FIG. 3 showing a RRC-to-MAC signaling and a signaling between UL/DL/BH schedulers in the case of RRC and medium access control (MAC) layers being separated, e.g., virtualized at a cloud, it should be noted that a respective modified RRC-to-MAC signaling may be performed at the extended RAN nodes 1 (e.g., Ext. BS1) and 2 (e.g., Ext. BS2) in order to update a respective scheduler in the respective MAC layer (depicted as UL MAC scheduler and DL MAC scheduler) concerning a configuration of the selected DRB(s) per quality of service (QoS) flow. The modified RRC-to-MAC signaling may include a so-called "MAC_Config UPDATE" message which may be defined in order to provide the MAC with the required treatment policies for the local E2E path joint DRB establishment at the extended RAN nodes 1 (e.g., Ext. BS1) and 2 (e.g., Ext. BS2) involved in establishing the local E2E path connecting the source node (e.g., UE1) and the target node (e.g., UE2). This modified RRC-to-MAC signaling may be transmitted over an internal RAN interface (denoted as F1 interface in 3GPP) in the case of a control plane (CP)/user plane (UP) split and/or a CP/CP split.

Figure 4:
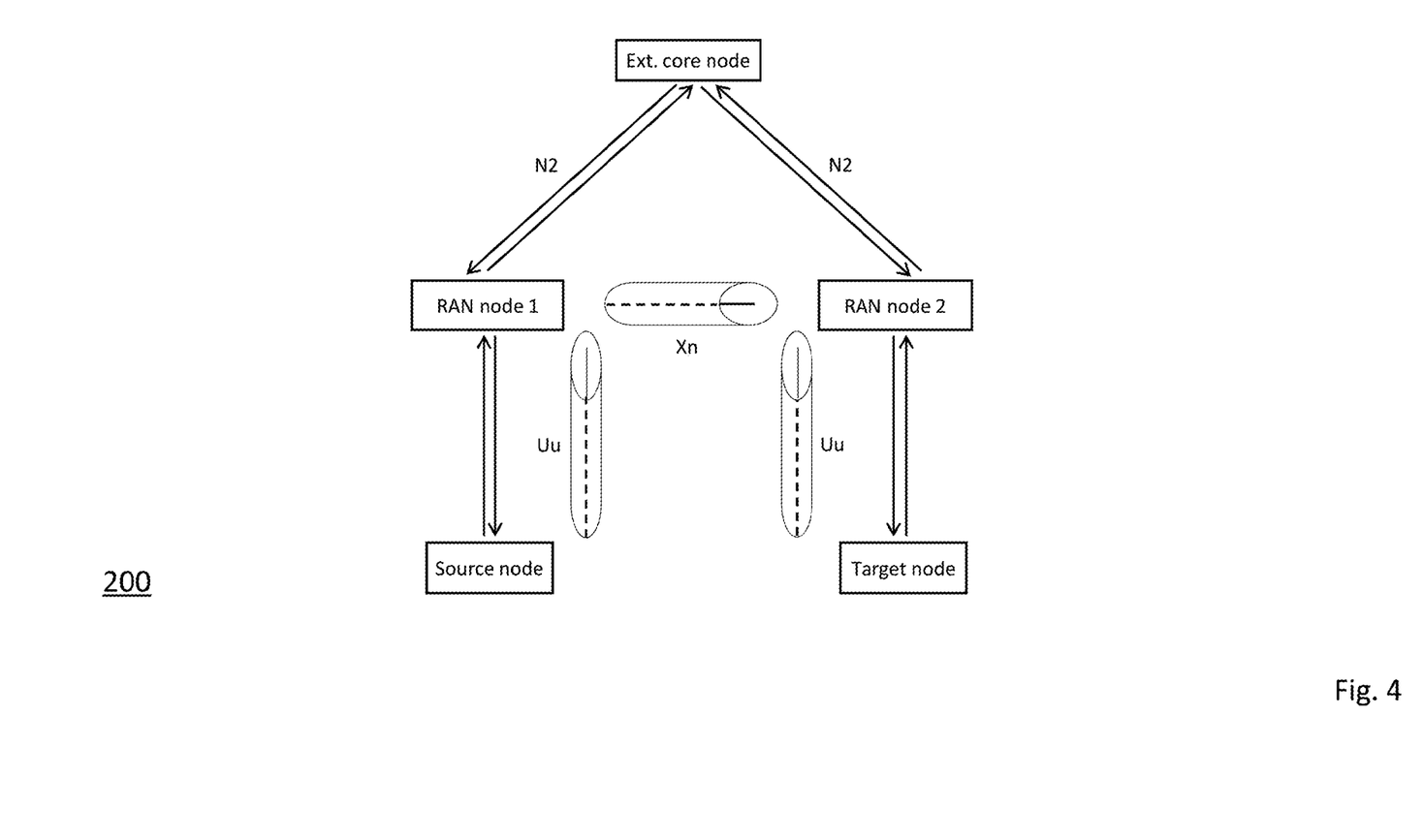
FIG. 4 shows a schematic communication system with signaling messages across interfaces for establishing a local E2E path connecting a source node and a target node by means of a core network node extended with the functionality of a configuration module, according to an embodiment of the present disclosure.

FIG. 4 shows a schematic communication system 200 with signaling messages across interfaces (Uu, N2/NG2, Xn) for establishing a local E2E path connecting a source node (e.g., a source or transmitting UE) and a target node (e.g., a target or receiving UE) by means of a core network (CN) node as a CN-C entity (e.g., a mobility management entity (MME), an access and mobility function (AMF) entity) extended with the functionality of a configuration module, according to an embodiment of the present disclosure.

The CN node as functionally extended with the functionality of the configuration module is depicted as Ext. CN node, and will be hereinafter referred to extended CN node. The configuration module is implemented in the CN node and provides the CN node hosting the configuration module with the functionality (e.g., a geo-link establishment functionality) of establishing a local E2E path connecting the source node and the target node.

Figure 5:
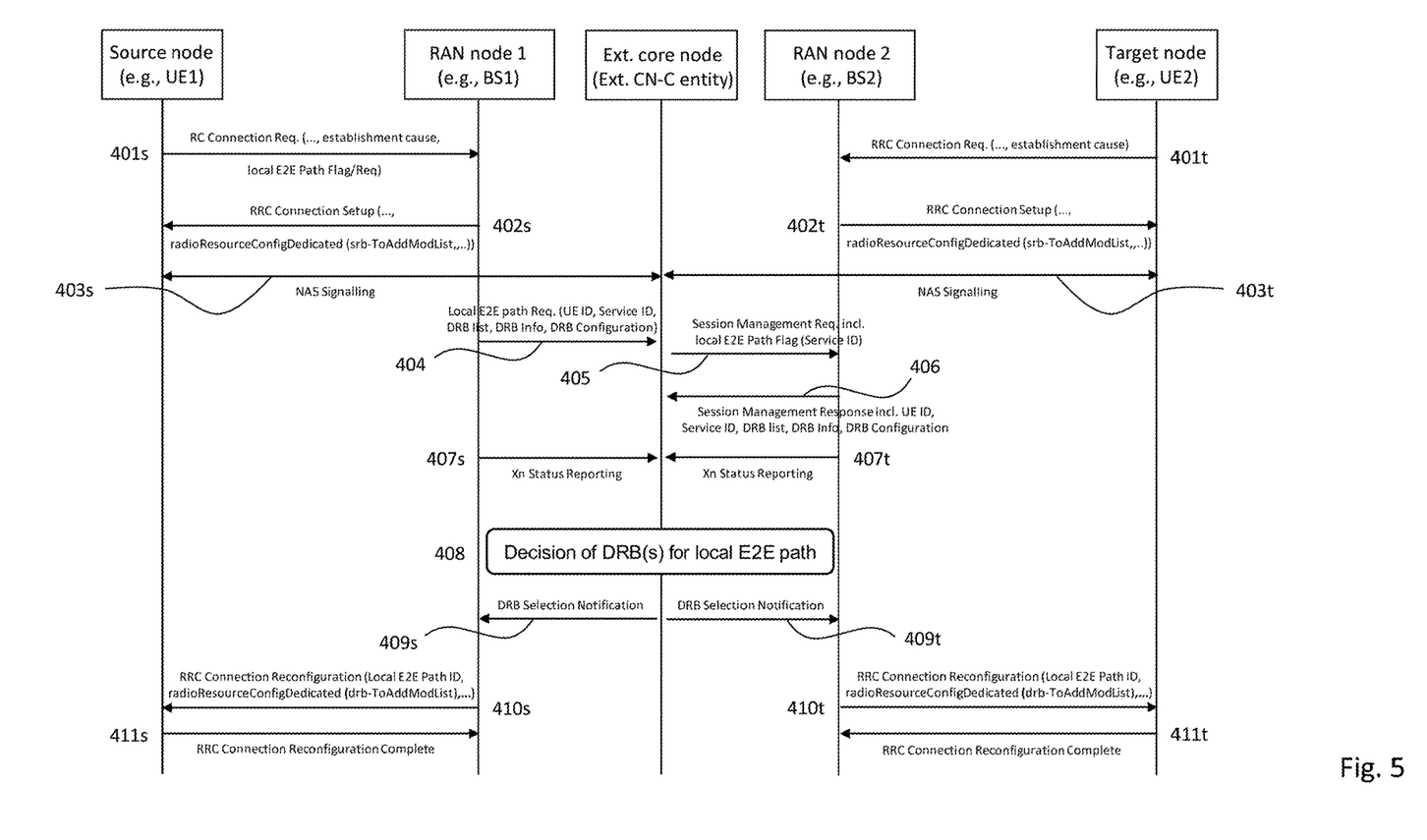
FIG. 5 shows a message sequence chart illustrating the establishment of a local E2E path connecting a source node and a target node by means of a core network node extended with the functionality of a configuration module, according to an embodiment of the present disclosure.

Referring to FIG. 4, FIG. 5 shows a message sequence chart (MSC) illustrating the establishment of the local E2E path connecting the source node (e.g., UE1) and the target node (e.g., UE2) by means of the extended CN node and serving RAN nodes (e.g., base stations (BSs), also known as gNBs in 5G terminology), according to an embodiment of the present disclosure. In FIGS. 4 and 5, the serving RAN nodes are depicted as a RAN node 1 (e.g., BS1) serving the source node and a RAN node 2 (e.g., BS2) serving the target node.

Each RAN node (i.e., RAN node 1 and RAN node 2) requires, from the user side (i.e., from the respective source and target nodes), radio measurements (steps 401$s$ and 401$t$). In order to initiate and trigger a RRC connection configuration, in step 401$s$, the source node transmits a RRC connection request message across a Uu interface towards the RAN node 1 serving the source node. The RRC connection request message may, for example, include a parameter indicating an establishment cause and be extended with an additional "local E2E path flag/req" parameter indicating that a local E2E path is requested to support a request for the local E2E path establishment. Thereby, the source node notifies the network (NW) about or requests from the network (NW) the local E2E path establishment for a given V2X application. In step 401$t$, the target node, for its part, transmits its RRC connection request message across the Uu interface towards the RAN node 2 serving the target node. This RRC connection request message may, for example, include a parameter indicating an establishment cause.

In step 402$s$, in response to the RRC connection request message received from the source node, the RAN node 1 transmits a RRC connection setup message across the Uu interface towards the source node. In step 402$t$, in response to the RRC connection request message received from the target node, the RAN node 2, for its part, transmits its RRC connection setup message across the Uu interface towards the target node. Each RRC connection setup message may, for example, include a so-called "radioResourceConfigDedicated" parameter including the "srb-ToAddModList" information element (IE) as disclosed in the technical specification: 3GPP TS 36.331, V14.2.2 (2017-04).

Once the respective RRC connection has been set up, each one amongst the source and target nodes uses that radio connection in respective steps 403$s$ and 403$t$ in order to communicate with the extended CN node using a respective non-access stratum (NAS) signaling and thereby to coordinate the service.

In step 404, the RAN node 1 transmits, across a N2/NG2 interface and towards the extended CN node, a so-called local E2E path request message, which may include, in a non-restrictive manner, the following parameters: an identifier (ID) of the source node (e.g., UE1 ID), a service ID, an ID of the local E2E path to be established, the list of DRBs, information on the DRBs regarding, for example, priorities, an abstract or detailed configuration of the DRB(s) or the list of the DRBs (e.g., MAC ID) to be considered or negotiated, and an abstract or detailed BH information on BH capacity and latency requirements which are required for the local E2E path.

In step 405, the extended CN node transmits, across a N2/NG2 interface and towards the RAN node 2, a session management request message including the "local E2E path flag" parameter and the service ID.

In step 406, upon receiving the session management request message from the extended CN node, the RAN node 2 transmits, across a N2/NG2 interface and towards the extended CN node, a session management response message including, in a non-restrictive manner, the following parameters: an identifier (ID) of the target node (e.g., UE2 ID), a service ID, a list of DRBs, information on the DRBs, an abstract or detailed configuration of the DRB(s) or the list of the DRBs (e.g., MAC ID) to be considered or negotiated.

In steps 407$s$ and 407$t$, the RAN nodes 1 and 2 jointly transmit a respective so-called "Xn status reporting" message reporting on the Xn condition, capabilities and availability.

In step 408, the extended CN node initially decides on or selects the DRBs per QoS flow for both the source node and the target node based on the preferences and/or recommendations of the source and target nodes, the traffic, resource and load situation of the RAN nodes 1 and 2, and the resource and load situation of the BH link.

In steps 409$s$ and 409$t$, the extended CN node notifies both the RAN node 1 and the RAN node 2 involved in establishing the local E2E path about the selected DRBs per QoS flow by transmitting a respective DRB selection notification message across the N2/NG2 interface towards the RAN node 1 and the RAN node 2. Each DRB selection notification message may, for example, include the local E2E path ID parameter indicating the ID of the local E2E path to be established, the list of the selected DRBs and information on the DRBs regarding, for example, priorities.

In steps 410$s$ and 410$t$, the notified RAN nodes 1 and 2 jointly trigger a RRC connection reconfiguration by transmitting a respective RRC connection reconfiguration message across a Uu interface towards the source node (step 410$s$) and the target node (step 410$t$). Each RRC connection reconfiguration message may, for example, include the "local E2E path ID" parameter indicating the ID of the local E2E path to be established.

In steps 411$s$ and 411$t$, in response to their received RRC connection reconfiguration message, the source node and the target node jointly transmit a respective RRC connection reconfiguration completion message across the Uu interface towards the RAN node 1 serving the source node and the RAN node 2 serving the target node, thereby completing the establishment of the local E2E path.

In the present embodiment of FIG. 5, the establishment of the local E2E path is triggered by transmitting the session management request from the CN node towards the RAN node 2 serving the target node (step 405), after the extended CN node has received the local E2E path request from the source node through the RAN node 1 serving the source node (step 404). However, in another embodiment, the establishment of the local E2E path may be triggered by transmitting a service request from the source node or all other nodes of the network towards the CN node through the RAN node 1 serving the source node. In such other embodiment, the establishment of the local E2E path may then be carried out by a session management function (SMF) and a user plane function (UPF) across a N4 interface. In that case, the local E2E path request message and the DRB selection notification message will be message extensions in the control plane (CP) signaling across the N2/NG2 interface.

It should be noted that, although the present disclosure, for the purpose of clarity, has been described in reference to the establishment of one local E2E path connecting one source node and one target node via two RAN nodes 1 and 2 which communicate with one CN node, it may also apply, broadly speaking, to the establishment of one or more local E2E paths connecting one or more source nodes and one or more target nodes via one or more RAN nodes which communicate with one or more CN nodes.

The present disclosure relates to a configuration module allowing to establish a local E2E path connecting at least one source node and at least one target node via at least one RAN node. The configuration module is configured to select DRBs per QoS flow based on inter-node information from the at least one source node, the at least one target node, the at least one RAN node and all other nodes involved in establishing the local E2E path, and is also configured to initiate, after selecting the DRBs per QoS flow, a RRC connection configuration using an identification (ID) of the local E2E path to be established. Thereby, a localized traffic between the at least one source node and the at least one target node can be exchanged with QoS guarantees. In particular, for services with tight KPIs in terms of reliability and latency, the present disclosure enables a cellular-based V2V service communication while guaranteeing performance even when vehicles are connected to each other and communicate between themselves via different base stations or gNBs.

While the present invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A configuration module for establishing a local end-to-end (E2E) path, in a vehicle-to-everything service communication, connecting at least one source node and at least one target node via at least one radio access network (RAN) node, the configuration module being configured to:
   select data radio bearers (DRBs) per quality of service (QoS) flow based on inter-node information from the at least one source node, the at least one target node, the at least one RAN node, and all other nodes involved in establishing the local E2E path; and
   initiate, after selecting the DRBs per the QoS flow, a radio resource communication (RRC) connection configuration using an identification (ID) of the local E2E path to be established.

2. A radio access network (RAN) node, the RAN node comprising a configuration module,
   wherein the RAN node is configured to communicate with at least one core network (CN) node,
   wherein the configuration module is configured to establish a local end-to-end (E2E) path, in a vehicle-to-everything service communication, connecting at least one source node and at least one target node via the RAN node, and
   wherein the configuration module is configured to:
   select data radio bearers (DRBs) per quality of service (QoS) flow based on inter-node information from the at least one source node, the at least one target node, the RAN node, and all other nodes involved in establishing the local E2E path; and
   initiate, after selecting the DRBs per the QoS flow, a radio resource communication (RRC) connection configuration using an identification (ID) of the local E2E path to be established.

3. The RAN node of claim 2, wherein the RAN node is configured to select the DRBs per the QoS flow through a selection by negotiating the selection of the DRBs per the QoS flow with all the other RAN nodes involved in establishing the local E2E path.

4. The RAN node of claim 2, wherein the at RAN node is configured to initiate and trigger, upon selecting the DRBs per the QoS flow, the RRC connection configuration using the ID of the local E2E path to be established, and is configured to transmit the ID of the local E2E path to be established towards the at least one source node and the at least one target node.

5. The RAN node of claim 2, wherein the RAN node is configured to notify the at least one CN node about the local E2E path to be established and the selected DRBs per the QoS flow.

6. A core network (CN) node, the CN node comprising a configuration module,
    wherein the CN node is configured to communicate with at least one radio access network (RAN) node,
    wherein the configuration module is configured to establish a local end-to-end (E2E) path, in a vehicle-to-everything service communication, connecting at least one source node and at least one target node via the at least one RAN node, and
    wherein the configuration module is configured to:
        select data radio bearers (DRBs) per quality of service (QoS) flow based on inter-node information from the at least one source node, the at least one target node, the at least one RAN node, and all other nodes involved in establishing the local E2E path; and
        initiate, after selecting the DRBs per the QoS flow, a radio resource communication (RRC) connection configuration using an identification (ID) of the local E2E path to be established.

7. The CN node of claim 6, wherein the CN node is configured to select the DRBs per the QoS flow for both the at least one source node and the at least one target node.

8. The CN node of claim 7, wherein the CN node is configured to notify the at least one RAN node involved in establishing the local E2E path about the selected DRBs per the QoS flow.

9. The CN node of claim 8, wherein the notified at least one RAN node is configured to trigger the RRC connection configuration using the ID of the local E2E path to be established, and configured to transmit the ID of the local E2E path to be established towards the at least one source node and the at least one target node.

10. A method for establishing a local end-to-end (E2E) path, in a vehicle-to-everything service communication, connecting at least one source node and at least one target node via at least one radio access network (RAN) node, the method comprising:
    selecting data radio bearers (DRBs) per quality of service (QoS) flow based on inter-node information from the at least one source node, the at least one target node, the at least one RAN node and all other nodes involved in establishing the local E2E path; and
    initiating, after selecting the DRBs per the QoS flow, a radio resource communication (RRC) connection configuration using an identification (ID) of the local E2E path to be established.

11. The method of claim 10, wherein the method is performed by the at least one RAN node, wherein selecting the DRBs per the QoS flow through a selection comprises negotiating the selection of the DRBs per the QoS flow with all the other RAN nodes involved in establishing the local E2E path.

12. The method of claim 11, the method being performed by the at least one RAN node, the method comprising:
    notifying, by the at least one RAN node and after selecting the DRBs per the QoS flow, at least one core network (CN) node about the local E2E path to be established and the selected DRBs per the QoS flow.

13. The method of claim 10, the method being performed by at least one core network (CN) node, wherein selecting the DRBs per the QoS flow comprises selecting the DRBs per the QoS flow for both the at least one source node and the at least one target node.

14. The method of claim 13, the method being performed by the at least one CN node, the method comprising:
    notifying, by the at least one CN node and after selecting the DRBs per QoS flow, the at least one RAN node involved in establishing the local E2E path about the selected DRBs per the QoS flow.

* * * * *